United States Patent Office 3,706,766
Patented Dec. 19, 1972

3,706,766
1-CARBAMOYL-2-PHENYLIMINOPYRROLIDINES
Fred M. Hershenson, Morton Grove, Ill., assignor to
G. D. Searle & Co., Chicago, Ill.
No Drawing. Filed Mar. 22, 1971, Ser. No. 126,948
Int. Cl. C07d 27/04
U.S. Cl. 260—326.3                           6 Claims

ABSTRACT OF THE DISCLOSURE 2-phenyliminopyrrolidines having an alkyl- or aryl-carbamoyl substituent at the 1-position are described herein. The compounds involved are useful as anti-hypertensive agents. They are prepared by the reaction of a 2-phenyl-iminopyrrolidine with an appropriate isocyanate.

The present invention relates to 1-(N-substituted carbamoyl)-2-phenyliminopyrrolidines. More particularly, it relates to a group of compounds having the following general formula

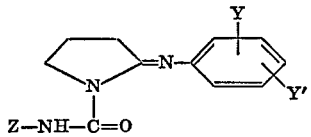

wherein Y and Y' can be the same or different and are selected from the group consisting of lower alkyl and halogen; and Z is selected from the group consisting of lower alkyl, lower alkenyl, phenyl, tolyl, halophenyl and naphthyl. The lower alkyl and lower alkenyl radicals referred to above contain up to 6 carbon atoms. Examples of such lower alkyl radicals are methyl, ethyl, and butyl; examples of such lower alkenyl radicals are allyl and crotyl. The halogen atoms referred to above include fluorine, chlorine, bromine and iodine. The halophenyl radicals referred to above include fluorophenyl, chlorophenyl, bromophenyl and iodophenyl.

The compounds of the present inventon are prepared by the reaction of an isocyanate of the formula

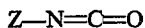

wherein Z is defined as above, with a 2-phenyliminopyrrolidine of the formula

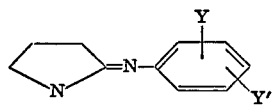

wherein Y and Y' are defined as above. Although the second reactant is depicted above as a 2-phenyliminopyrrolidine, this material can tautomerize so that it can exist in the form of a 2-phenylamino-1-pyrroline. The reaction involved is carried out with heating in an inert solvent such as methylene chloride.

The present compounds are useful as anti-hypertensive agents. This utility is demonstrated by the following test procedure which makes use of the fact that chronic administration of desoxycorticosterone acetate induces a self-sustaining hyptertension that is similar in many respects to essential hypertension in man (D. N. Green et al., American Journal of Physiology, 170, 94, 1952). In this test, 50-g. male Charles River rats are implanted with a 20 mg. wax pellet containing 10 mg. of desoxycorticosterone acetate. After 5 weeks, their systolic blood pressures are measured electrophygmographically on the tail artery. The following day, groups of 5 rats are then given 60 mpk. of test compound intragastrically. Four hours later, the blood pressures are again measured and the decrease in pressure from control day is calculated and compared with concurrent controls. A compound is considered active if it produces a significant decrease in systolic blood pressure. When 1-(N-phenylcarbamoyl)-2 - (3,4 - xylylimino)pyrrolidine, 1-(N-phenylcarbamoyl)-2-(2,6 - xylylimino)pyrrolidine, and 1-[N-(2-chlorophenyl)carbamoyl]-2 - (3,4-xylylimino)pyrrolidine were tested by the above procedure, each produce a significant decrease in blood pressure.

The following examples are presented to further illustrate the present invention; they should not be construed as limiting it in spirit or in scope. In these examples, temperatures are indicated in degrees centigrade (° C.) and quantities are indicated in parts by weight unless parts by volume are specified. The relationship existing between parts by weight and parts by volume is the same as that existing between grams and milliliters.

EXAMPLE 1

To a solution of 34 parts of 2-pyrrolidinone in 18 parts of toluene cooled to 10° C., there is added portionwise a solution of 31 parts of phosphorus oxychloride in 18 parts of toluene with constant stirring. The addition requires 20 minutes and stirring is then continued for 3 hours while the temperature is allowed to rise to room temperature. The mixture is then allowed to stand at room temperature for 16 hours. To this mixture there is added a solution of 24.2 parts of 3,4-dimethylaniline in 18 parts of toluene over a period of 15 minutes. The mixture is then heated to 110° C. and maintained at that temperature for 32 hours. It is then allowed to stand at room temperature for 16 hours during which time a solid forms. The toluene supernatant is decanted and the solid material is heated in 100 parts of water on a steam bath. The resulting dark red aqueous solution is cooled to 25° C. and 200 parts of 4 N aqueous sodium hydroxide solution is added with cooling and stirring. The mixture is then extracted with 175 parts of benzene and the benzene extract is cooled. The precipitate which forms is separated by filtration and recrystallized from acetonitrile to give 2-(3,4-xylylamino)-1-pyrroline melting at about 151–153° C.

If the above procedure is repeated using 2,4-dimethylaniline and 2,6-diethylaniline in place of the 3,4-dimethylaniline, the products obtained are, respectively, 2-(2,4-xylylamino)-1-pyrroline melting at about 82–83.5° C. and 2-(2,6-diethylanilino)-1-pyrroline melting at about 48.5–53.5° C.

EXAMPLE 2

A solution of 18.8 parts of 2-(3,4-xylylamino)-1-pyrroline and 23.8 parts of phenyl isocyanate in 270 parts of methylene chloride is heated to reflux for 2 hours. The mixture is cooled and the solvent is evaporated under reduced pressure. The residual yellow oil is triturated with ether, cooled, and filtered and 300 parts by volume of hexane is added to the yellow ether filtrate. The resulting solution is cooled in a refrigerator for 5 hours and the precipitate which forms is separated by filtration and recrystallized from a mixture of ethanol and water to give 1-(N-phenylcarbamoyl)-2-(3,4-xylylimino)pyrrolidine melting at about 114–116° C. This compound has the following formula

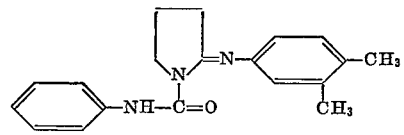

EXAMPLE 3

The procedure of Example 2 is repeated using 1.9 parts of 2-(3,4-xylylamino)-1-pyrroline, 3.2 parts of 2-chlorophenyl isocyanate and 45 parts of methylene chloride. The crude product obtained after evaporation of the reaction solvent crystallizes on standing at room temperature and is recrystallized from ethanol to give 1-[N-(2 - chlorophenyl)carbamoyl]-2-(3,4-xylylimino)pyrrolidine melting at about 126–128° C.

The same procedure is repeated using 3-chlorophenyl isocyanate. The crude product obtained is heated with ethanol and the resulting ethanol solution is separated and cooled. The yellow precipitate which forms is separated by filtration to give 1-[N-(3-chlorophenyl)carbamoyl]-2-(3,4 - xylylimino)pyrrolidine melting at about 170.5–173° C.

The procedure of Example 2 is repeated using 4-chlorophenyl isocyanate in place of the phenyl isocyanate. In this case, the crude solid product is first triturated with ethanol and then recrystallized from ethanol to give 1-[N-(4 - chlorophenyl)carbamoyl]-2-(3,4-xylylimino)-pyrrolidine melting at about 141–143° C.

If the procedure of Example 2 is repeated using 4-fluorophenyl isocyanate and 2-tolyl isocyanate in place of the phenyl isocyanate, the products obtained are, respectively, 1-[N-(4-fluorophenyl)carbamoyl]-2-(3,4-xylylimino)pyrrolidine and 1-[N-(2-tolyl)carbamoyl]-2-(3,4-xylylimino)pyrrolidine.

EXAMPLE 4

A solution of 3.8 parts of 2-(2,4-xylylamino)-1-pyrroline and 5.8 parts of phenyl isocyanate in 100 parts of methylene chloride is heated at reflux for 1 hour. The mixture is then cooled and the solvent is evaporated under reduced pressure. The residue is then dissolved in about 30 parts of ethanol and 5 parts of water is added with cooling; crystallization takes place. The solid is separated by filtration to give 1-(N-phenylcarbamoyl)-2-(2,4-xylylimino)pyrrolidine melting at about 73–74.5° C.

EXAMPLE 5

To a solution of 4.5 parts of 2-(2,6-xylylamino)-1-pyrroline hydrochloride in water there is added a solution of 5 parts of anhydrous sodium carbonate in water. The resulting mixture is extracted with two 50-ml. portions of methylene chloride and the combined extracts are dried over anhydrous sodium sulfate, filtered, and added to a solution of 5.8 parts of phenyl isocyanate in 32 parts of methylene chloride. The resulting mixture is refluxed for 1 hour and then cooled to room temperature. The solvent is evaporated under reduced pressure and the residual oil is dissolved in ethanol and then cooled. The solid which forms is separated by filtration and recrystallized a second time from ethanol to give 1-(N-phenylcarbamoyl)-2-(2,6-xylylimino)pyrrolidine melting at about 149–150.5° C. This compound has the following formula

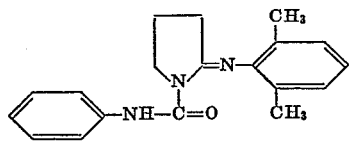

1-[N-(1-naphthyl)carbamoyl] - 2 - (2,6-xylylimino)-pyrrolidine is obtained when the above procedure is repeated using 1-naphthyl isocyanate in place of the phenyl isocyanate.

EXAMPLE 6

A solution is prepared from 2.2 parts of 2-(2,6-diethylanilino)-1-pyrroline and 2.4 parts of phenyl isocyanate in 53 parts of methylene chloride and it is refluxed for 2 hours. The mixture is then cooled and the solvent is evaporated under reduced pressure. The resultant residual oil is triturated with ethanol and crystallization takes place. The solid is washed with ethanol and then recrystallized from ethanol to give 1-(N-phenylcarbamoyl)-2-(2,6-diethylphenylimino)pyrrolidine melting at about 145–146.5° C.

If the above procedure is repeated using 2-(2-ethyl-6-methylanilino)-1-pyrroline and phenyl isocyanate, 1-(N-phenylcarbamoyl)-2-(2-ethyl - 6 - methylphenylimino)pyrrolidine is obtained. This compound melts at about 118–123° C. after recrystallization from hexane.

EXAMPLE 7

To a solution of 2.7 parts of 2-(2,6-dichloroanilino)-1-pyrroline hydrochloride in 20 parts of water there is added a solution of 3 parts of sodium carbonate in 20 parts of water. The resulting alkaline mixture is extracted with two 35-ml. portions of methylene chloride and the combined extracts are dried over anhydrous sodium sulfate, filtered, and added to 2.4 parts of phenyl isocyanate. The resulting mixture is refluxed for 90 minutes and then cooled and the solvent is evaporated under reduced pressure. A semi-solid residue is obtained and this is triturated with ethanol and then recrystallized from ethanol to give 1-(N-phenylcarbamoyl)-2-(2,6-dichlorophenylimino)pyrrolidine melting at about 152–155° C. This compound has the following formula

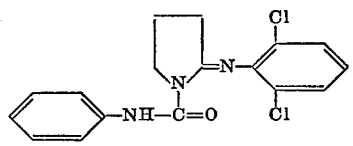

EXAMPLE 8

A solution of 2.3 parts of 2-(2,6-dichloroanilino)-1-pyrroline and 3.1 parts of 2-chlorophenyl isocyanate in 130 parts of methylene chloride is refluxed for 90 minutes. The mixture is then cooled and the solvent in evaporated under reduced pressure to leave a colorless oil. This is triturated with ethanol but no precipitate forms so the solvent is evaporated to leave a thick oil which eventually crystallizes. This is washed with hexane and recrystallized from ethanol to give 1-[N-(2-chlorophenyl)carbamoyl]-2-(2,6 - dichlorophenylimino)pyrrolidine melting at about 179–185° C.

If the above procedure is repeated using 4-chlorophenyl isocyanate in place of the 2-chlorophenyl isocyanate, the crude product is obtained as a solid which is recrystallized from ethanol to give 1-[N-(4-chlorophenyl)carbamoyl]-2-(2,6-dichlorophenylimino)pyrrolidine melting at about 181–183° C.

EXAMPLE 9

If the procedure of Example 8 is repeated using 1.2 parts of methyl isocyanate in place of the 2-chlorophenyl isocyanate, the crude product is obtained as a solid which is recrystallized from heptane to give 1-(N-methylcarbamoyl) - 2 - (2,6 - dichlorophenylimino)pyrrolidine melting at about 84–84.5° C.

If 2-(2,6-dichloranilino)pyrrolidine is reacted with ethyl isocyanate and with allyl isocyanate according to the above procedure, the products obtained are, respectively, 1 - (N - ethylcarbamoyl) - 2-(2,6-dichlorophenylimino)-pyrrolidine and 1-(N-allylcarbamoyl)-2-(2,6-dichlorophenylimino)pyrrolidine.

What is claimed is:

1. A compound of the formula

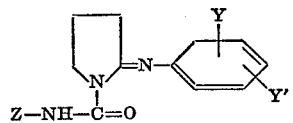

wherein Y and Y' are each selected from the group consisting of methyl, ethyl, and chloro; and Z is selected from the group consisting of lower alkyl, lower alkenyl, phenyl, halophenyl, tolyl, and naphthyl.

2. A compound according to claim 1 which has the formula

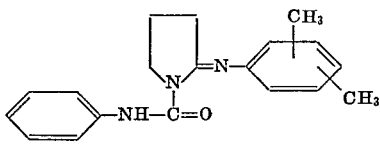

3. A compound according to claim 1 which is 1-(N-phenylcarbamoyl)-2-(3,4-xylylimino)pyrrolidine.

4. A compound according to claim 1 which is 1-(N-phenylcarbamonyl)-2-(2,6-xylylimino)pyrrolidine.

5. A compound according to claim 1 which is 1-(N-phenylcarbamoyl)-2-(2,6-diethylphenylimino)pyrrolidine.

6. A compound according to claim 1 which is 1-(N-phenylcarbamoyl) - 2 - (2,6 - dichlorophenylimino)pyrrolidine.

References Cited

UNITED STATES PATENTS 3,320,252  5/1967  Doebel et al. _____ 260—247

ALEX MAZEL, Primary Examiner

J. A. NARCAVAGE, Assistant Examiner

U.S. Cl. X.R.

424—274